U S009330492B2

United States Patent
Tokuyoshi

(10) Patent No.: US 9,330,492 B2
(45) Date of Patent: May 3, 2016

(54) PREDICTION METHOD, GENERATION METHOD AND STORAGE MEDIUM

(71) Applicant: SQUARE ENIX CO., LTD., Tokyo (JP)

(72) Inventor: Yusuke Tokuyoshi, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 240 days.

(21) Appl. No.: 14/202,243

(22) Filed: Mar. 10, 2014

(65) Prior Publication Data

US 2014/0292757 A1    Oct. 2, 2014

(30) Foreign Application Priority Data

Mar. 29, 2013   (JP) ................................. 2013-074433

(51) Int. Cl.
*G06T 15/50* (2011.01)
*G06T 15/06* (2011.01)

(52) U.S. Cl.
CPC ................. *G06T 15/50* (2013.01); *G06T 15/06* (2013.01); *G06T 15/506* (2013.01)

(58) Field of Classification Search
CPC ....... G06T 15/06; G06T 15/506; G06T 15/50; G06T 15/55; G06T 15/205; G06T 15/60; G06T 15/04; G06T 2215/12
See application file for complete search history.

(56) References Cited

FOREIGN PATENT DOCUMENTS

WO    2008/091958    7/2008

OTHER PUBLICATIONS

Hermes, Jan, et al. "Global Illumination using Parallel Global Ray-Bundles."VMV. 2010.*
Vasilakis, Andreas, and Ioannis Fudos. "S-buffer: Sparsity-aware Multi-fragment Rendering." Eurographics (short papers). 2012.*
Vasilakis, A., and Ioannis Fudos. "Depth-fighting aware methods for multifragment rendering." Visualization and Computer Graphics, IEEE Transactions on 19.6 (Jun. 2013): 967-977.*
Maule, Marilena, et al. "Memory-efficient order-independent transparency with dynamic fragment buffer." Graphics, Patterns and Images (SIBGRAPI), 2012 25th SIBGRAPI Conference on. IEEE, 2012.*
Tokuyoshi, Yusuke, et al. "Adaptive Ray—bundle Tracing with Memory Usage Prediction: Efficient Global Illumination in Large Scenes." Computer Graphics Forum. vol. 32. No. 7. (Oct. 2013).*
Tokuyoshi et al., "Fast Global Illumination Baking via Ray-Bundles", SIGGRAPH Asia 2011 Technical Sketches (2011).
Nicolas Thibieroz, "Order Independent Transparency using Per-Pixel Linked Lists", GPU Pro 2, A K Peters, pp. 409-431 (Mar. 11, 2011).
Paul Rosen, "Rectilinear Texture Warping for Fast Adaptive Shadow Mapping", I3D '12 Proceedings of the ACM SIGGRAPH Symposium on Interactive 3D Graphics and Games, pp. 151-158 (2012).

(Continued)

*Primary Examiner* — Gregory J Tryder
*Assistant Examiner* — Scott E Sonners
(74) *Attorney, Agent, or Firm* — Greenblum & Bernstein, P.L.C.

(57) ABSTRACT

A prediction method generates a fragment number map having a predetermined number of pixels and a mipmap of the fragment number map, and for a pixel of one layer in the mipmap, derives an estimated number of fragments included on average on one light path in a case where ray-bundles for a light transport computation are defined for a corresponding region in a 3D scene corresponding to the pixel, and outputs, as a predicted number of ray-bundle light paths for the computation storable in a predetermined memory region for a pixel of one layer, a value obtained by dividing the size of the memory region by this value. The method derives an estimated number of fragments by adding a compensation value corresponding to a layer of the pixels in the number of fragments which is a pixel value of one pixel.

7 Claims, 8 Drawing Sheets

(56) References Cited

OTHER PUBLICATIONS

Extended European Search Report (EESR) issued by European Patent Office (EPO) in European Patent Application No. 14157055.6, dated Jan. 29, 2016.

Yusuke Tokuyoshi et al., "Real-Time Bidirectional Path Tracing via Rasterization", Proceedings of the ACM SIGGRAPH Symposium on Interactive 3D Graphics and Games, I3D '12, XP055236173, p. 183 (Jan. 1, 2012).

\* cited by examiner

FIG. 5A
FIG. 5B
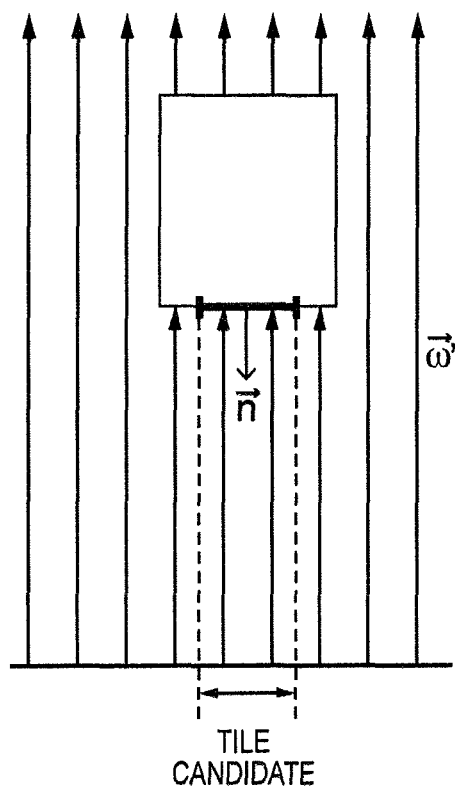
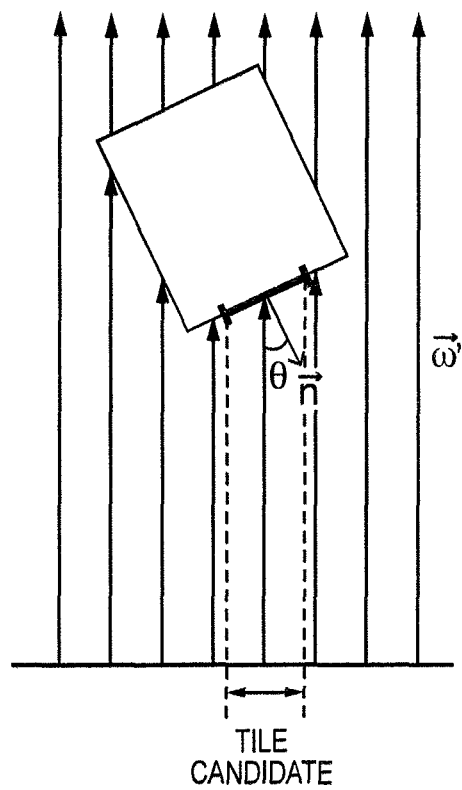

PREDICTION METHOD, GENERATION METHOD AND STORAGE MEDIUM

BACKGROUND OF THE INVENTION

1. Field of the Invention

The present invention relates to a prediction method, a generation method, and a storage medium, and particularly to a technique for illuminating computation in 3D scene rendering.

2. Description of the Related Art

3DCG (Three-Dimensional Computer Graphics) is used as a visualization expression method in various fields not limited to games and movies. In the technical field of this kind of 3DCG generation, in recent years, various methods have been proposed for more realistic depiction or for high quality rendering expression.

As a method of expression for making more realistic depiction in 3DCG, the method of reflecting effects due to Global Illumination exists. In this method, for one rendering object, by not only rendering shading that occurs directly based on defined illumination (a light source), but also rendering shading considering indirect illumination that appears due the light source reflecting in another rendering object, a rendering expression having more realism can be provided.

On the other hand, because processing for global illumination employs such things as a ray tracing method, which traces the complicated propagation of a light ray, in general the amount of computation is large, and so usage for a scene for which real-time screen rendering is required, such as for a game, is difficult. In contrast to this, there are methods that easily improve the realism of 3DCG simply by generating a light map in which indirect illumination of a 3D scene to be rendered is pre-computed and applying the light map in the rendering processing as a texture, in order to optimize rendering processing in which indirect illumination is reflected.

Note, this kind of light map is something generated by computing global illumination, and time is required for the generation. Because the generation of the light map is performed by integrating (rendering equation) the effects (the diffuse reflections, the specular reflections, etc.) due to virtual light sources that occur due to incident light input into the target 3D scene reaching a surface of a rendering object, for various ray directions in a region on a rendering object to which the texels of the light map are applied, processing time increases in accordance with the number of rays considered, the number of ray directions, and so on. In Yusuke Tokuyoshi et al., "Fast Global Illumination Baking via Ray-Bundles" (SIGGRAPH Asia 2011 Technical Sketches), a method is disclosed in which processing time is reduced by reflections between rendering objects lined up in a depth direction on the same ray being optimized on a GPU by collecting them in a linked list in the scene analysis for one ray direction of light map generation.

However, in the generation of the light map using the Tokuyoshi method, the amount of information differs depending on the sampling ray direction. For this reason, it was necessary to adjust so that memory did not overflow by allocating an excessive region of memory beforehand for ray-bundle generation processing, or by reducing the resolution (the number of rays) of the ray-bundles generated beforehand within a limited region of memory so that the processing was possible.

In contrast to this, in Nicolas Thibieroz, "Order-Independent Transparency using Per-Pixel Linked Lists" of GPU Pro 2, A K Peters, 2011, p. 409-431, a method in which a two-dimensional region of a scene in a projection of a sampling ray direction is divided into grid tiles having the same size, and generating a ray-bundle for each tile has been proposed. With this, because ray-bundles are generated for the tiles which are portions of the region and not the entire scene, memory usage can be reduced.

However, while the memory usage was reduced relatively in the scene analysis for the light map generation of the method of Thibieroz and the method of Tokuyoshi, the absolute memory usage was not predicted. In other words, neither of the documents predicted the memory usage required for ray-bundle generation. Consequently, optimization by ideal usage of memory in the ray-bundle generation processing was not realized.

SUMMARY OF THE INVENTION

The present invention was made in view of such problems in the conventional technique. The present invention provides a prediction method capable of suitably predicting memory usage in an illuminating computation, a method of generation and a storage medium.

The present invention in its first aspect provides a prediction method that predicts, in an illuminating computation of a 3D scene performed by defining a plurality of ray-bundles for a light transport computation for predetermined ray directions, a number of ray-bundle light paths for the light transport computation storable in a predetermined memory region, the prediction method comprising: a first generation step of generating a fragment number map having a predetermined number of pixels, and a mipmap of the fragment number map, for which a pixel value of each pixel is made to be a number of fragments in the 3D scene on a straight line of a ray direction corresponding to a position of the pixel; a derivation step of deriving, in a case where, for a pixel of one layer in the mipmap of the fragment number map generated in the first generation step, ray-bundles for the light transport computation are defined for a corresponding region in the 3D scene corresponding to the pixel, an estimated number of fragments included on average on one light path; and a prediction step of outputting, as a predicted number of light paths of ray-bundles for the light transport computation storable in the predetermined memory region for the pixel of the one layer, a value obtained from a size of the predetermined memory region being divided by the estimated number of fragments derived in the derivation step, wherein, in the derivation step, the estimated number of fragments is derived by a compensation value being added to a number of fragments, which is a pixel value of the pixel of the one layer, the compensation value corresponding to a layer of the pixel.

The present invention in its second aspect provides a prediction method that predicts, in an illuminating computation of a 3D scene performed by defining a plurality of ray-bundles for a light transport computation for predetermined ray directions, a number of ray-bundle light paths for the light transport computation storable in a predetermined memory region, comprising: a first generation step of generating a fragment number map having a predetermined number of pixels, and a mipmap of the fragment number map, for which a pixel value of each pixel is made to be a number of fragments in the 3D scene on a straight line of a ray direction corresponding to a position of the pixel; a second generation step of generating an importance map, having the same number of pixels as the fragment number map, for which a pixel value of each pixel is made to be a texel density of an illumination texture applied to a fragment existing on the same straight line as a corresponding pixel of the fragment number map, and a mipmap of the importance map; a derivation step of, for a pixel of one layer in the mipmap of the fragment number map generated in the first generation step, determining a parameter that changes, in accordance with a distribution of a texel density in a region of the importance map referenced in the generation of a pixel of the mipmap of the importance map corresponding to the pixel, a distribution of a ray-bundles for the light transport computation to be defined and deriving, in a case where the distribution of ray-bundles for the light transport computation after changing for a corresponding region of the 3D scene corresponding to the pixel of the one layer is defined, referring to the determined parameter, an estimated number of fragments included on average on one light path; and a prediction step of outputting, as a predicted number of light paths of ray-bundles for the light transport computation storable in the predetermined memory region for the pixel of the one layer, a value obtained from a size of the predetermined memory region being divided by the estimated number of fragments derived in the derivation step, wherein, in the derivation step, the estimated number of fragments is derived by a weighted average being taken, with a texel density which is a corresponding pixel value of the importance map, for a number of fragments, which is a pixel value of the fragment number map for the corresponding region, and a compensation value according to a layer of the pixels being added to an obtained weighted average number of fragments.

The present invention in its third aspect provides a method of generation for generating a light map by an illuminating computation of a 3D scene performed by defining ray-bundles for a light transport computation for each of a plurality of ray directions, comprising: a setting step of setting a ray direction that defines ray-bundles for the light transport computation; a first generation step of generating a fragment number map having a predetermined number of pixels, and a mipmap of the fragment number map, for which a pixel value of each pixel is made to be a number of fragments in the 3D scene on a straight line of a ray direction set in the setting step corresponding to a position of the pixel; a second generation step of generating an importance map, having the same number of pixels as the fragment number map, for which a pixel value of each pixel is made to be a texel density of an illumination texture applied to a fragment existing on the same straight line as a corresponding pixel of the fragment number map, and a mipmap of the importance map; a determining step of determining a processing region which is a unit for which, with respect to the 3D scene in the set ray direction referring to the mipmap of the fragment number map and the mipmap of the importance map, ray-bundles for the light transport computation are defined and an illuminating computation for light map generation is executed; and a computation step of defining ray-bundles for the light transport computation and executing illuminating computation for light map generation for each processing region determined in the determining step, wherein in the determining step, for pixels of the same position of one layer in the mipmap of the fragment number map and the mipmap of the importance map, in a case where a predicted number of ray-bundle light paths for the light transport computation storable in a predetermined memory region, output to a corresponding region in the 3D scene corresponding to the pixels by the prediction method, is larger than a number of texels included in the corresponding region, the corresponding region is determined to be the processing region.

Further features of the present invention will become apparent from the following description of exemplary embodiments (with reference to the attached drawings).

BRIEF DESCRIPTION OF THE DRAWINGS

FIGS. 5A and 5B are views for explaining tile generation condition of the tiling processing in accordance with embodiments of the present invention.

DESCRIPTION OF THE EMBODIMENTS

First Embodiment

Below, detailed explanation for the explanatory embodiment of the present invention will be given with reference to the drawings. Note that in the embodiment explained below, explanation will be given of an example in which the present invention is adopted to a PC, capable of generating a light map to be applied to a 3D scene, which is an example of an apparatus that executes a prediction method. However, the present invention can be adopted to other devices capable of executing illuminating computation of a 3D scene.

Figure 3:
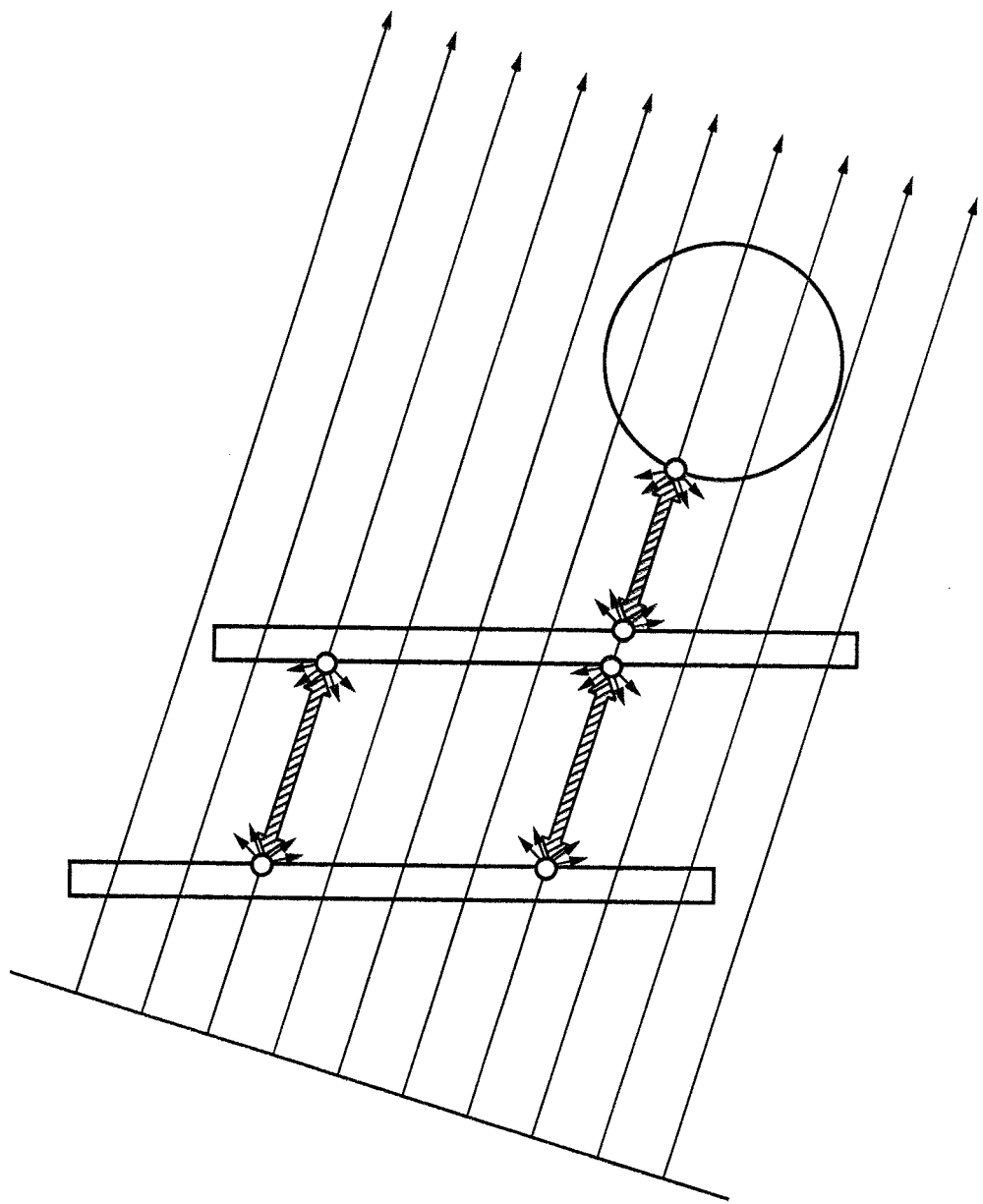
FIG. 3 is a view for explaining a target of a light map that the PC 100 generates according to embodiments of the present invention.

Also, in the specification, "a ray-bundle" will be explained as an aggregation of light paths (ray paths) for computation (light transport computation) of the inter-reflection effects that arise between rendering objects arranged in a target 3D scene. In the generation processing of the light map, because it is necessary to consider inter-reflections of various ray directions as described above, a ray-bundle parallel to a ray direction for an entire target 3D scene is defined for each set ray direction, and a light transport computation for each light path is performed. Note, there are cases in which a plurality of inter-reflections occur on one light path, depending on the set ray direction, as shown in FIG. 3, for example. In such a case, because light transport computation is performed for an inter-reflection of each section, the light transport computation for one light path is reflected in different texels of the light map.

<Configuration of a PC 100>

Figure 1:
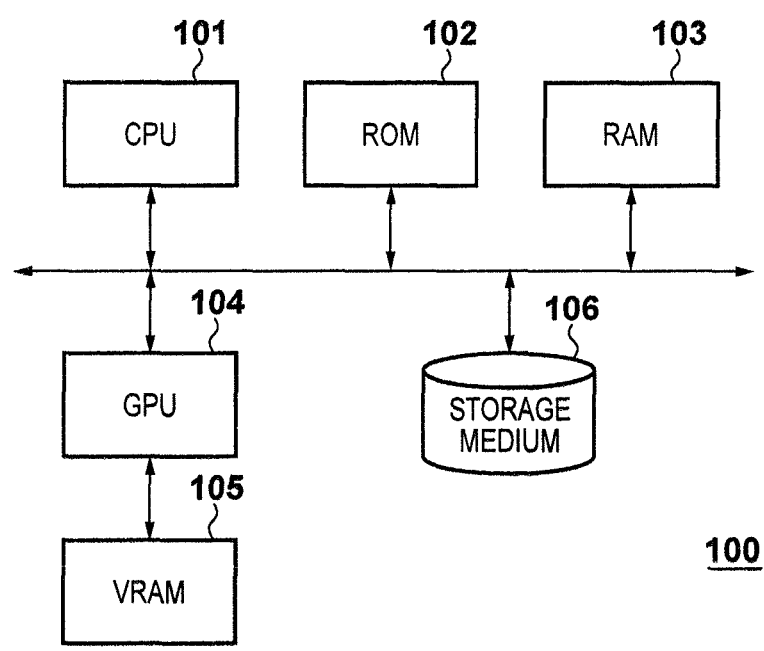
FIG. 1 is a block diagram showing a functional configuration of a PC 100 according to an embodiment of the present invention.

FIG. 1 is a block diagram for showing a functional configuration of a PC 100 according to embodiments of the present invention.

A CPU 101 controls operation of each block that the PC 100 has. Specifically, the CPU 101 controls operations of the blocks by reading out operation programs of the blocks stored in a ROM 102 or a storage medium 106, loading them into a RAM 103, and executing them.

The ROM 102 is a rewritable, non-volatile memory, for example. The ROM 102, in addition to storing operation programs of the blocks of the PC 100, stores parameters necessary for the operation of the blocks. The RAM 103 is a volatile memory. The RAM 103, as well as being a loading area of operation programs of the blocks, is also used as a storage area for storing intermediate data output in operation of the blocks.

A GPU 104 performs rendering processing of 3D scenes in accordance with the later described light map generation processing. Specifically, the GPU 104 reads out model data for rendering objects recorded in a later described storage medium 106, for example, and loads them into a GPU memory (not shown). Also, the GPU 104 processes the model data in accordance with arrangement information provided from the CPU 101, and configures a 3D scene which is a target of light map generation in a VRAM 105, for example. Note, in this embodiment, the VRAM 105 is used in the light map generation processing as a light map generation region. Also, the VRAM 105 is used as a storage area of an importance map and a fragment number map generated in scene analysis for the light map generation of one ray direction.

A storage medium 106 is a storage medium, such as an HDD, for example, connected detachably to the PC 100. In this embodiment, data, such as rendering objects comprised in the 3D scene of the light map generation processing and arrangement information, and a program that defines operation of the processing, are recorded in the storage medium 106. Also, light maps generated by the light map generation processing are stored in the storage medium 106.

<Light Map Generation Processing>

Figure 2:
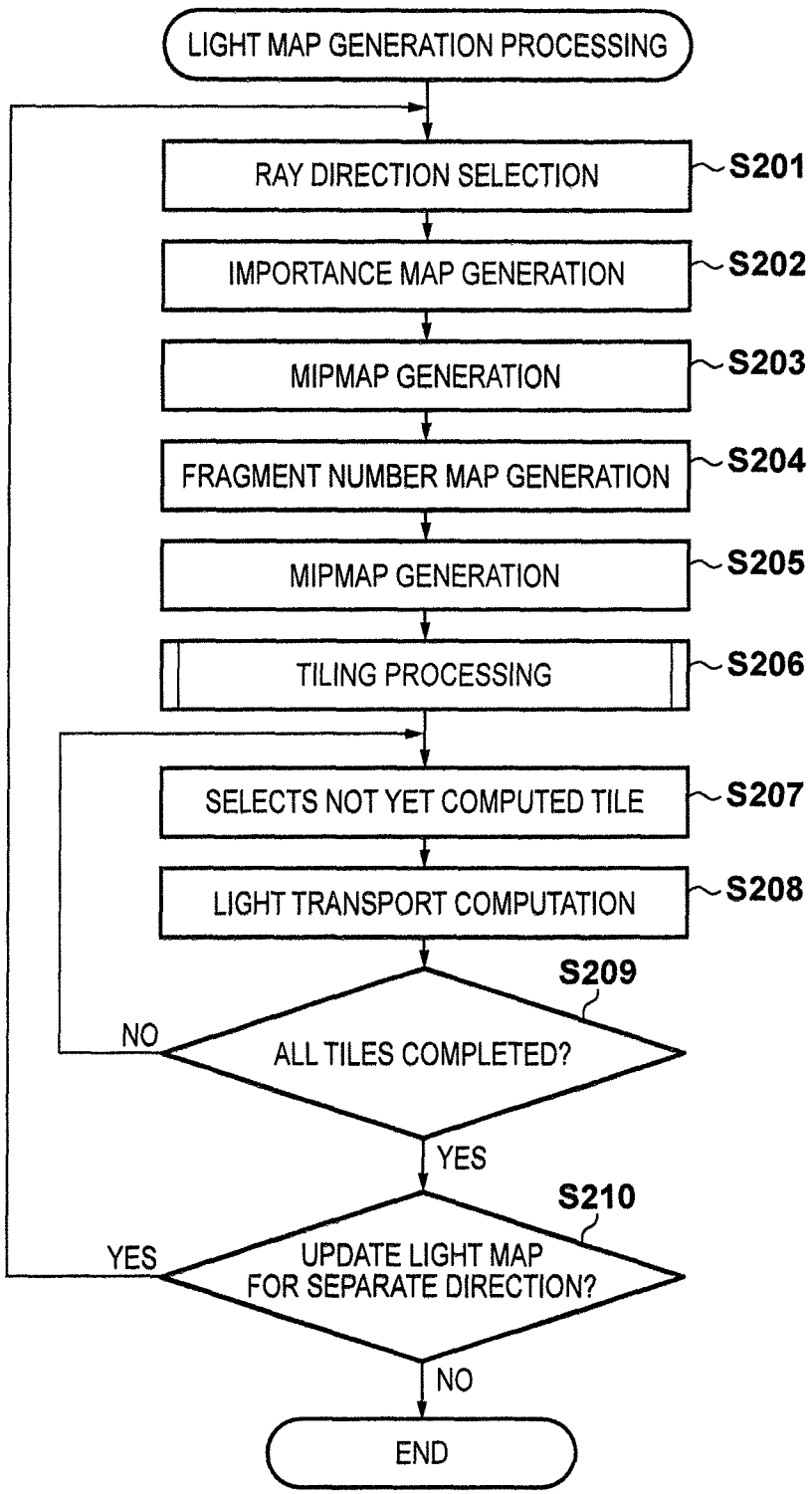
FIG. 2 is a flowchart showing an example of light map generation processing executed on the PC 100 according to a first embodiment of the present invention.

Explanation will be given of specific processing for the light map generation processing of the PC 100 of this embodiment having this kind of configuration, using the flowchart of FIG. 2. Note, explanation is given having this light map generation processing be initiated when a light map generation request is made for a 3D scene determined by arrangement information, for example.

In step S201, the CPU 101 selects a direction (ray direction) of the ray-bundle to be generated. In order to reproduce the indirect illumination that occurs due to incident light of various directions for one 3D scene, generally a light map is generated by integrating values of incident radiance of each of a plurality of ray directions. In this step, selection of a sampling ray direction in the generation processing of the light map is performed, but the selection method is not specifically limited.

In step S202, the GPU 104 performs importance analysis on the entire scene for the selected ray direction, and generates an importance map. In this embodiment, the importance map is two-dimensional data rendered for a projection of the ray direction, and is defined so as to include the entire scene in the selected ray direction.

Importance is a level of contribution to the light map, and corresponds to a texel density (number of pixels per a unit area in a system defined in the 3D scene of the light map applied to a surface of a rendering object which has a fragment) in a fragment. The fragment here indicates an intersection with the surface of a rendering object existing on one straight line (representative light path) corresponding to the pixels of the importance map as shown in FIG. 3.

The importance map generated in this step stores an importance value of a fragment existing on a corresponding representative light path for each pixel of the two-dimensional data. Note, because the representative light path is defined so as to pass through the entire 3D scene, there are cases in which a plurality of fragments exist on one representative light path. In other words, there are cases in which multiple intersections with rendering objects exist on one representative light path. In such a case, the importance value stored for the pixel corresponding to the representative light path is made to be the maximum value out of the importances of the plurality of fragments.

In step S203, the GPU 104 generates a mipmap of the importance map generated in the VRAM 105, and stores it in the VRAM 105. In order to simplify the generation of the mipmap, regarding the number of pixels of the importance map, the number of pixels of one side may be a power of two. In the generation of the mipmap, a pixel value of a unit pixel of one layer may be generated with an average value of four pixels corresponding to one layer below, for example, and as a result, an average value of pixel values of all pixels of the importance map will be stored in one pixel of the top layer.

In step S204, the GPU 104 performs fragment number analysis on the entire scene for a selected ray direction, and generates a fragment number map. The fragment number map in this embodiment, similarly to the importance map, is two-dimensional data rendered for a projection in a ray direction, and has a number of pixels identical to the importance map. Also, fragment numbers indicate the number of fragments existing on a representative light path of corresponding pixels of the fragment number map.

The number of fragments are numbers of fragments that exist on the representative light paths corresponding to each of the pixels, that is the numbers of fragments indicate the numbers of surfaces of rendering objects existing on the representative light paths. The fragment number map generated in this step stores the number of fragments on a corresponding representative light path for each of the pixels of the two-dimensional data. Note, explanation is given having the generation of the fragment number map be performed after generation of the importance map in this embodiment, but working of the present invention is not limited to this. In other words, the generation of the two maps is in no particular order, and it should be easily understood that the two maps may be simultaneously generated in parallel.

In step S205, the GPU 104 generates a mipmap of the fragment number map generated in the VRAM 105 and stores it in the VRAM 105. Note, generation rules of the mipmap are the same as in the method described for the generation of the mipmap of the importance map in step S203.

In step S206, the GPU 104 executes tiling processing to divide a two-dimensional region of the 3D scene in a projection of a ray direction adaptively into tiles each having an ideal size, which are units at which the GPU 104 generates the ray-bundles and performs the light transport computation.

As described above, in the generation processing of the light map, a ray-bundle is defined for the direction for each of a plurality of ray directions, and the light transport computation is performed. However, due to restrictions in such things as memory capacity and the amount of computation, a predetermined limit in the number of light paths of the ray-bundles to be generated exists. In other words, in a case where the ray-bundles are defined for a huge 3D scene, for example, there is the possibility that the number of light paths of the ray-bundles that pass through the surface will be less than the number of pixels (texels) of the light map applied to the surface of a specific rendering object. In such a case, i.e. in a case where the resolution of the ray-bundles is less than the texel density of the light map to be generated, reflections occurring between ray-bundles are not considered, light that should be reflected in the light map to be generated is missed, and ideal indirect illumination is not expressed.

For this reason, each of the tiles are defined, by executing the tiling processing of this step on the PC 100 of this embodiment, for two-dimensional regions of a 3D scene in a projection in a selected ray direction so that light that should be reflected is not missed. Note, the tiling processing of this embodiment, rather than simply defining tiles of a predetermined number of pixels for a two-dimensional region, as in Thibieroz, defines the tiles, causing to be different the number of pixels of the tiles adaptively in accordance with the texel density of the light map applied to rendering objects within a tile. Specifically, as later described, each tile is defined so that the number of ray-bundles that can be generated within the limitations of the hardware is larger than the number of pixels of the light map applied to rendering objects within the tile.

<Tiling Processing>

Figure 4:
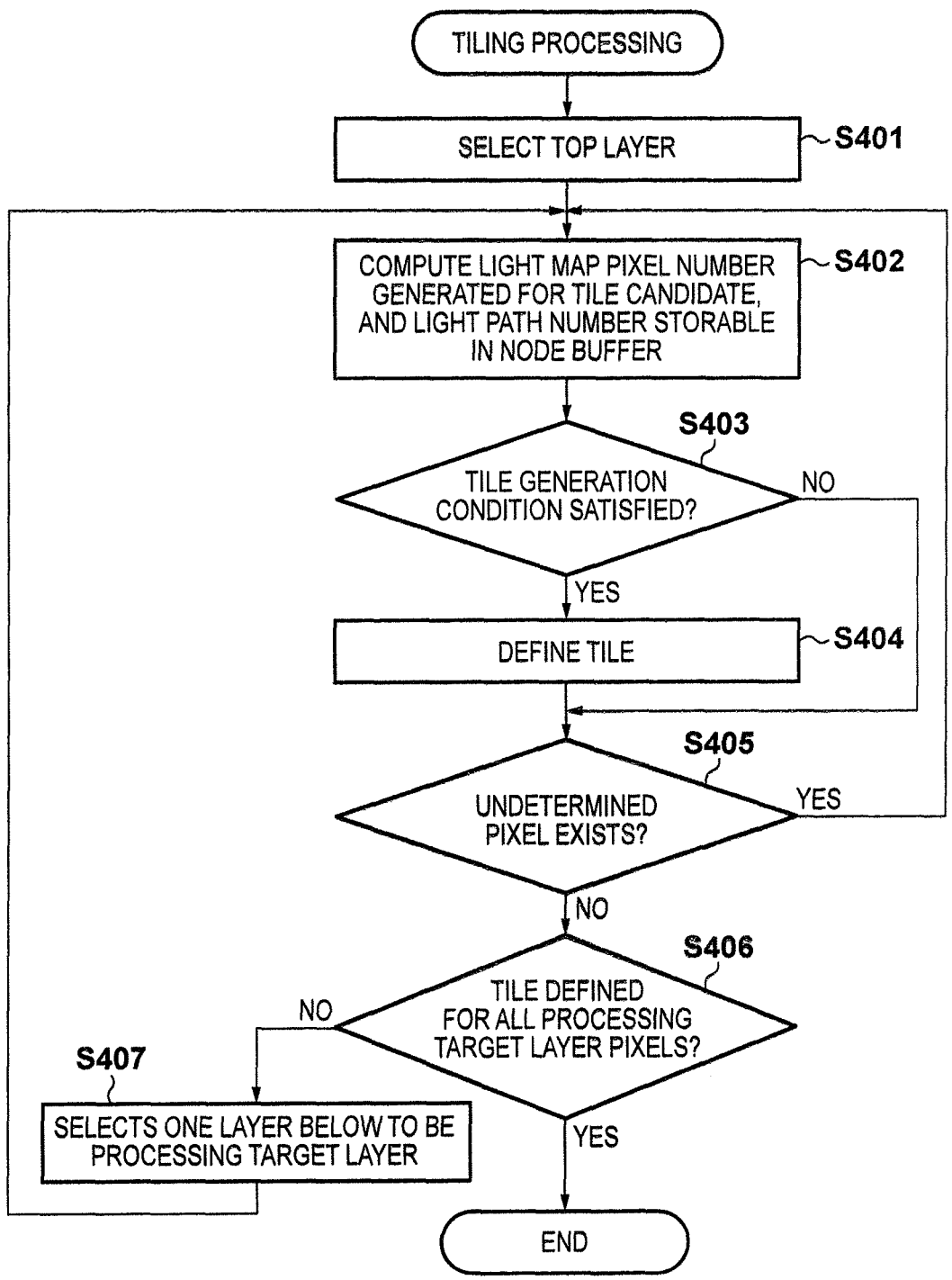
FIG. 4 is a flowchart showing an example of tiling processing executed by the PC 100 according to the first embodiment of the present invention.

Detailed explanation will be given for tiling processing executed by the GPU 104 of this embodiment, with reference to the flowchart of FIG. 4.

In step S401, the GPU 104 selects the top layer of the mipmaps of the importance map and the fragment number map respectively to be the processing target layers.

In step S402, the GPU 104 selects pixels (target pixels) for which tile generation is undetermined out of the pixels of the mipmaps of the processing target layer (pixels existing at the same position in each mipmap). Also, the GPU 104 sets a region corresponding to the target pixels in the importance map and the fragment number map to be "a tile candidate". The region corresponding to the target pixels is a region of the importance map or the fragment number map referenced in order to generate the target pixel on the mipmap. The GPU 104, referring to the pixel values of the target pixels of each of the mipmaps, computes a number of pixels of a light map to be generated for the tile candidate and a number of light paths (number of rays included in a ray-bundle) storable in a predetermined storage area (a node buffer), on the VRAM 105, to be defined for the tile candidate.

Specifically, the GPU 104 computes the number of pixels (the number of pixels on the importance map) of the light map to be generated for the tile candidate by multiplying a surface area of the tile candidate with the pixel value (importance) of the target pixel obtained from the mipmap of the importance map. In other words, by the following equation, the number of pixels of the light map to be generated for the tile candidate is computed:

Number of pixels of light map to be generated for tile candidate=Importance of target pixel(Texel density)×Number of pixels reference in generation of target pixel.

Also, the number of light paths storable in the predetermined node buffer is derived by the following equation:

Number of light paths *sotrable* in predetermined node buffer =

$$\min\left(\begin{array}{c}\text{Maximum number of light paths, Number of storable light paths}\\ \text{predetermined considering number of fragments}\end{array}\right).$$

Where, min( ) is a function that outputs the minimum value of enumerated values. Also, the maximum number of light paths is a value (for example, a power of 4096) predetermined to be the maximum value of the number of light paths included in the ray-bundles to be generated for one tile.

When the ray-bundles are generated, one fragment on the light path for one node of the predetermined node buffer is stored. However, there is the possibility that a plurality of fragments exist on each light path of the ray-bundles generated as described above. In other words, a node for storing individually the fragments for a plurality of fragments existing on one light path is necessary. In other words in a case where the total number of fragments on all of the light paths when ray-bundles are generated exceeds the number of nodes, the ray-bundles cannot be stored to the node buffer. For this reason, in the tiling processing of this embodiment, a storable number of light paths predicted considering the number of fragments is determined having computed with the following equation:

Storable number of light paths (1)

predetermined considering number of fragments =

$$\frac{\text{Node buffer size}}{\text{Predicted fragment number} + \text{Estimated prediction error}}.$$

Where, the predicted number of fragments is the pixel value of the target pixel of the mipmap of the fragment number map, and is the average pixel value of the pixels included in the tile candidate of the fragment number map. In other words, the predicted number of fragments indicates that the light paths defined for the tile candidate have the pixel value number of fragments on average. In other words, by dividing the node buffer size by the average number of fragments, it can be computed how many light paths having an average number of fragments are storable in the node buffer.

On the other hand, the number of light paths that should be defined for the tile candidate, as described above, is determined based on only the texel density on rendering objects included in the range of the tile candidate. In other words, the number of pixels of the fragment number map and the number of light paths that should be defined for the tile candidate are not necessarily the same.

For example, the average number of fragments obtained from one pixel of the top layer of the mipmap of the fragment number map is an average value of the number of fragments sampled for each of representative light paths defined to the number of pixels of the fragment number map. Here, considering a case where a number of light paths greater than the number of pixels of the fragment number map is defined for the region corresponding to one pixel of the top layer (i.e. the entire region of the 3D scene in the projection of the ray direction selected) a portion of the light paths includes light paths not considered in the generation of the fragment number map. In other words, the number of fragments on the light path of this portion is unclear, and cannot be predicted from the average number of fragments.

Note, because the representative light paths sampled for the tile candidate becomes less the lower the processing target layer of the mipmap, this kind of number of fragments for which the number of light paths is unclear increases.

For this reason, in equation 1, the number of light paths predicted to be storable is computed by compensating for an error in the number of fragments having considered the light paths for which the number of fragments is unclear, by adding an estimated prediction error to the predicted number of fragments obtained from the mipmap. Here, in this embodiment, the estimated prediction error is determined to be as follows so that the value becomes bigger the lower the layer of the pixel of the mipmap is:

$$\text{Estimated prediction error} = S\left(a + \frac{b}{N_j}\right). \quad (2)$$

where, S is the predicted number of fragments obtained from one pixel of the mipmap of the top layer, and $N_j$ is the number of pixels (the number of pixels in the tile candidate) referenced in the generation of one pixel in the j-th layer Also, constants a and b are parameters that are set based on experimentation, and they may be set to such values as a=0.05 and b=64 in a case where, for example, the fragment number map is defined at 2048[px]×2048[px]. Note, in this embodiment, explanation is given having the values of a and b set based on experimentation, but embodiments of the present invention are not limited to this, and, for example, the values may be determined in accordance with such things as a number of rendering objects arranged in the 3D scene of the target, a number of surfaces, or the number of pixels of the fragment number map.

In step S403, the GPU 104 determines whether or not the target pixel satisfies a tile generation condition. Specifically, tile generation condition is determined by the PC 100 by determining whether or not the relationship
(the number of pixels of the light map generated for the target pixel<the number of light paths storable in the predetermined node buffer)
holds true for the two values computed for the target pixels in step S402. This generation condition is a condition for light map having no loss of light being generatable, as described above.

Note, the tile generation determination is always performed under the same conditions independent of the ray direction and the surface normal of rendering objects having a fragment.

For example, a case is considered in which the surface of a rendering object is directly facing in the selected ray direction, i.e. the ray direction and the surface normal are parallel, as shown in FIG. 5A. Here, the number of pixels of the light map to be generated for the tile candidate is obtained by multiplying the surface area of the tile candidate with the importance of the target pixel as described above. This is because since the surface of rendering object is directly facing the ray direction, the region on the surface corresponding to the tile candidate has the same surface area as the tile candidate.

On the other hand, a case is considered in which the surface of a rendering object is not directly facing the selected ray direction, i.e. when the angle between the ray direction and the surface normal is angle θ, as shown in FIG. 5B. Here, the region on the surface corresponding to the tile candidate is a surface area larger than the surface area of the tile candidate. Specifically, the value one obtained by the surface area of the tile candidate being divided by the dot product of the ray direction (ω'·n) and the surface normal n (inversely proportional to cos θ). In other words, because the number of pixels of the light map applied to the region on the surface of a rendering object corresponding to the tile candidate is larger in this case than when the surface is directly facing the selected ray direction, the texel density increases when seen from such a selected ray direction. In other words, the number of pixels of the light map to be generated for the tile candidate should be a factor of 1/(ω'·n) compared to when the surface is directly facing the selected ray direction.

However, it is known by the rendering equation that the incident radiance for the incident light from the ray direction ω' causing effects with respect to the radiance of the indirect illumination in a specific direction ω at a point x on the surface of a rendering object, in proportion to the dot product of the ray direction ω' and the surface normal n. In other words, the more the angle of incidence of the direction of the light is acute (θ is large), the smaller the contribution to the radiance of the indirect illumination will be, i.e. importance will be low.

Considering this comprehensively, because, in a case where the ray direction ω' and the surface normal n are at an angle, the number of pixels of the light map to be generated for the tile candidate increases by 1/(ω'·n) times, while the level of contribution of the incident light in the direction decreases by (ω'·n) times, these effects cancel out. In other words, because the values of the pixels of the importance map (the texel density) can be considered to be fixed irrespective of the ray direction, the tile generation determination may be performed for the number of pixels of the light map to be generated for the tile candidate obtained simply by multiplying the surface area of the tile candidate with the importance of the target pixel. Also, in the generation of the importance map described above as well, there is no necessity of adding the relationship with the surface normal of the rendering object according to the ray direction, and it can be simply made to be the texel density of the light map to be applied to the fragment.

The GPU 104 moves the processing to step S404 in a case where it determines that the target pixel satisfies tile generation condition, and moves the processing to step S405 in a case where it determines that the target pixel does not satisfy the generation condition.

In step S404, the GPU 104 defines the tile for the tile candidate. In other words, the GPU 104 performs tile setting, for a region set as the tile candidate out of the two-dimensional region of the 3D scene in the projection of the selected ray direction, so as to include the region in one tile.

In step S405, the GPU 104 determines whether or not a pixel for which tile generation is undetermined (a pixel for which no tile is defined and which has not been selected as the target pixel) exists out of the pixels of the mipmap of the processing target layer. The GPU 104 moves the processing to step S402 in a case where it determines that a pixel for which tile generation is undetermined exists, and moves the processing to step S406 in a case where it determines that such a pixel does not exist.

In step S406, the GPU 104 determines whether or not a tile is defined for all of the pixels of the mipmap of the processing target layer. The GPU 104 completes the tiling processing in a case where it determines that a tile is defined for all of the pixels of the mipmap of the processing target layer. Also, the GPU 104 selects one layer below the processing target layer to be the processing target layer in step S407, and returns the processing to step S402, in a case where it determines that a tile is not defined for all of the pixels.

In this way, by determining whether or not the tile generation condition is satisfied while selecting pixels of the mipmap in order, tiles can be defined adaptively such that the light map is generated with ideal conditions while predicting appropriately the number of light paths storable in a predetermined node buffer on the PC 100 of this embodiment.

Figure 6:
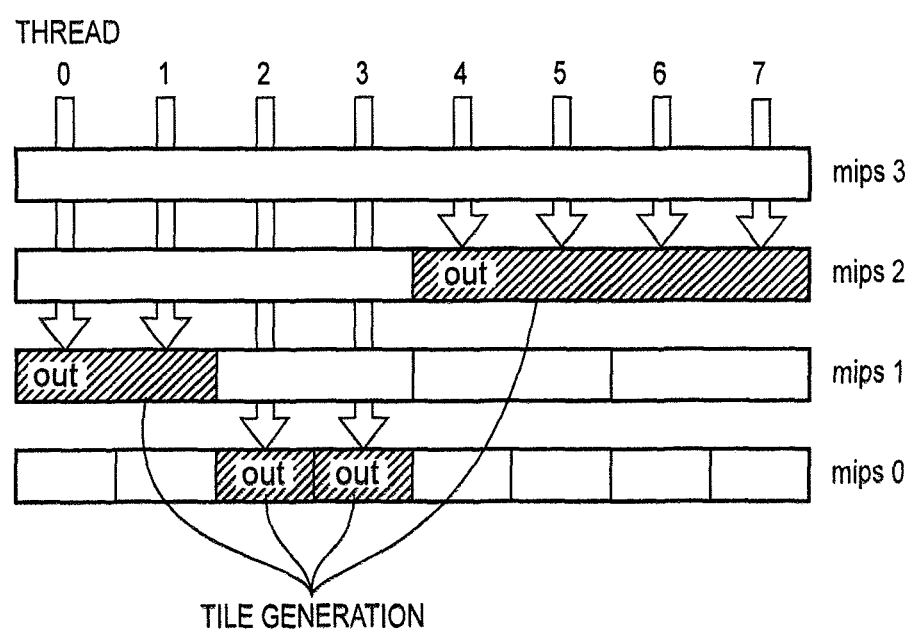
FIG. 6 is a view for explaining an implementation of the tiling processing executed on the PC 100 according to embodiments of the present invention.

Note, in this embodiment, the tiling processing is explained as something that performs tiling by looping processing of selecting layers of a mipmap and pixels of the layers in order and performing tile generation determination, but embodiments of the tiling processing are not limited to this. The tiling processing is also realizable by generating threads that process in parallel the number of pixels of the lowest layer of the mipmap and executing the determination processing while going down through the layers in order from the top layer, as illustrated in FIG. 6, for example. In such a case, because the threads are generated for the number of pixels of the lowest layer of the mipmap, there is no necessity to perform the tile generation determination while selecting the pixels in the layer in order, and tiling can be completed at higher speed. Note, for layers of the mipmap other than the lowest layer, control may be taken such that only one of the threads performing the determination of the tile generation condition for the same pixel performs the defining processing.

When the tiling processing completes, the CPU 101 moves the processing to step S207. In step S207, the CPU 101 selects a tile for which the light transport computation has not been performed out of the defined tiles.

In step S208, the GPU 104, under the control of the CPU 101, updates the values of the light map being generated by generating ray-bundles for the selected tiles, and performing the light transport computation using the VRAM 105 for each ray-bundle. The CPU 101 in this embodiment maintains a region in which to store the pixels of the light map being generated in the storage medium 106. Pixels allocated to each surface of a rendering object, to which the pixels of the light map are applied, are determined and values stored in the storage area of the pixels corresponding to the ray-bundles are updated using the computation results of the light transport computation.

In step S209, the CPU 101 determines whether or not the light transport computation was performed for all of the defined tiles. The CPU 101 moves the processing to step S210 in a case where it determines that the light transport computation was performed for all of the tiles, and it returns the processing to step S207 in a case where it determines that the light transport computation has not been performed for all of the tiles.

In step S210, the CPU 101 determines whether or not to define ray-bundles for a separate ray direction and update the light map. The CPU 101 returns the processing to step S201 in a case where it determines that it will define ray-bundles for a separate ray direction and update the light map, and it completes the light map generation processing in a case where it determines not to update the light map.

As explained above, the prediction method of this embodiment can predict suitably the memory usage in the illuminating computation. Specifically, the prediction method predicts, in an illuminating computation of a 3D scene performed by defining a plurality of ray-bundles for a light transport computation for predetermined ray directions, a number of light paths of ray-bundles for a light transport computation storable in a predetermined memory region. The prediction method generates a fragment number map having a predetermined number of pixels wherein the pixel value of each pixel is made to be the number of fragments in the 3D scene on a straight line of a ray direction corresponding to the position of the pixel, and a mipmap of the fragment number map. For a pixel of one layer in the mipmap of the fragment number map, an estimated number of fragments included on average on one light path in a case where a ray-bundle for the light transport computation is defined for a corresponding region in the 3D scene corresponding to the pixel is derived, and a value obtained by the size of a predetermined memory region divided by this value, is output as the predicted number of light paths of the ray-bundles for the light transport computation storable in the predetermined memory region for a pixel of one layer. Here, the prediction method derives the estimated number of fragments by adding a compensation value in accordance with the layer of the pixel to the number of fragments which is the pixel value of one pixel.

Also, because tiles can be divided adaptively having predicted the memory usage, the number of tiles is not increased unnecessarily, or because it is not necessary to reduce the resolution of the ray-bundles examined, the processing for the light map generation can be speeded up on the whole, or the resolution can be improved for the light map.

Second Embodiment

In the above described first embodiment, explanation was given having tiles be generated in a case where it is determined that a target pixel satisfies a tile generation condition according to an analysis of the mipmaps of the importance map and the fragment number map.

However, because the above described generation condition only uses an average value of the importance of the region corresponding to the target pixel, it is not something that considers a density distribution of importance in the region. In other words, in a case where a region exists where importance is high locally within the defined tile, there is the possibility that a loss of light that should be reflected occurs in the region as described above. In this kind of region having high importance locally, performing division of tiles excessively can be considered as a method of preventing loss of light from occurring. However, because an increase in the number of tiles leads to an increase in computation time, this is not advantageous from the perspective of optimizing the speed of the generation of the light map.

In this embodiment, explanation will be given for a method in which the light map is generated by generating the ray-bundles adaptively by changing the density of the light paths in the tiles adaptively by applying warping processing for each tile.

<Warping Processing>

Firstly, explanation will be given for the warping processing used in the light map generation processing of this embodiment.

The warping processing is disclosed in Paul Rosen, "Rectilinear Texture Warping for Fast Adaptive Shadow Mapping", I3D '12 Proceedings of the ACM SIGGRAPH Symposium on Interactive 3D Graphics and Games, p. 151-158. In this document, in order to improve the quality of a shadow applied to a surface of a rendering object, importance analysis is performed, and more pixels are allocated for regions for which importance is high, i.e. the generation of shadows having high resolution is required in a shadow mapping. Here, warping processing is used in order to adaptively widen regions on a shadow map to which shadows of regions for which importance is high are rendered.

In other words, in this embodiment, adaptive ray bundles that prevent loss of light are generated without performing excessive tile division by expanding, by warping processing, the range of regions of high importance in two-dimensional region of the 3D scene in the projection of the selected ray direction in accordance with analysis results of importance. In other words, distribution change of ray-bundles is performed so as to generate more ray-bundle rays for regions of high importance by warping processing.

<Light Map Generation Processing>

Figure 7:
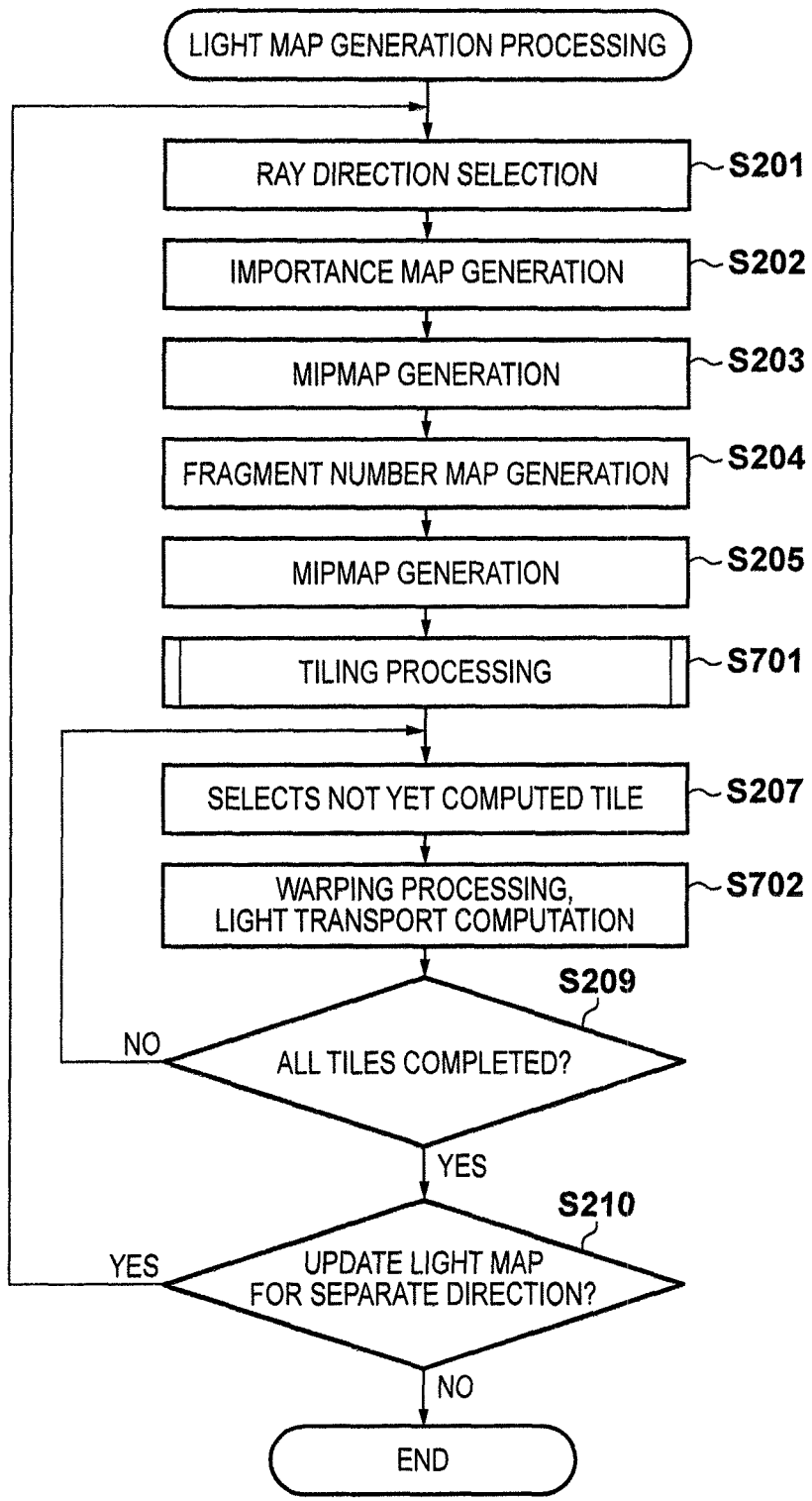
FIG. 7 is a flowchart showing an example of light map generation processing executed on the PC 100 according to a second embodiment of the present invention.

Below, explanation will be given for specific processing using the flowchart of FIG. 7 for the light map generation processing of the PC 100 of this embodiment. Note explanation will be omitted for the functional configuration of the PC 100 of this embodiment as it is similar to that of the above described first embodiment. Also, in the light map generation processing of this embodiment, for steps in which similar processing is performed to the light map generation processing of the first embodiment in the light map generation processing of this embodiment, explanation is omitted and identical reference numerals are given, and the explanation below is limited to the processing that is characteristic of this embodiment.

After the generation of the mipmap of the fragment number map by the GPU 104 completes in step S205, the GPU 104 executes the tiling processing of this embodiment in step S701.

<Tiling Processing>

Figure 8:
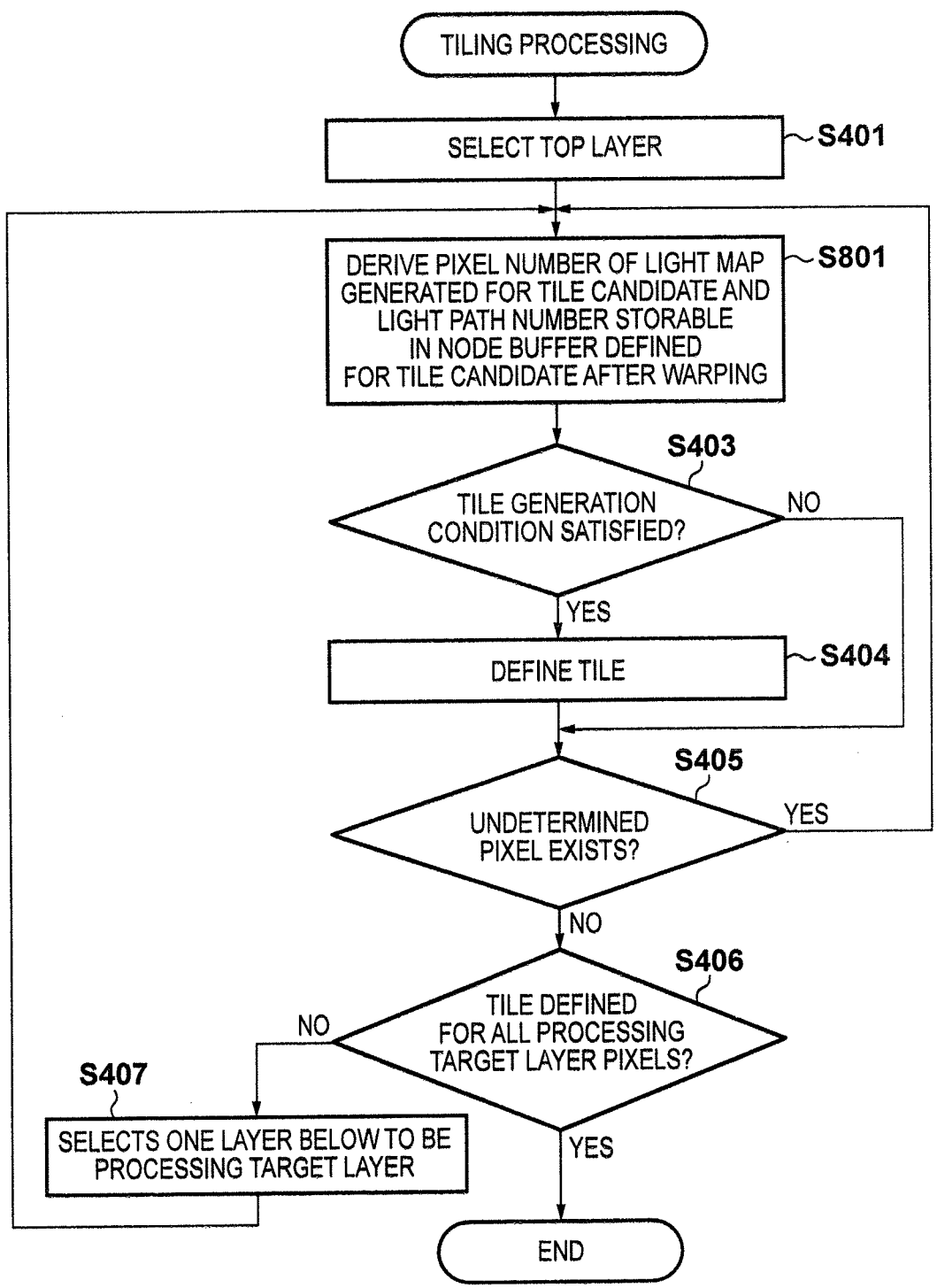
FIG. 8 is a flowchart showing an example of tiling processing executed by the PC 100 according to the second embodiment of the present invention.

Detailed explanation will be given for the tiling processing executed by the PC 100 of this embodiment with reference to the flowchart of FIG. 8. For this tiling processing, similarly to above, explanation is omitted and identical reference numerals are given for steps that perform processing similar to the tiling processing of the first embodiment.

In step S801, the GPU 104 selects a target pixel for which tile generation is undetermined out of the mipmap pixels of the processing target layer. Also, the GPU 104 sets, as the tile candidate, the region corresponding to the target pixel in the importance map and the fragment number map. The GPU 104 computes the number of pixels of the light map to be generated for the tile candidate referring to the target pixel and the number of light paths storable in the predetermined node buffer defined for the tile candidate after the warping.

Note, in the light map generation processing of this embodiment, rather than applying the warping processing for the entire scene as in Rosen, the warping processing is applied for each tile defined by this tiling processing as later explained. For this reason, the number of pixels of the light map to be generated for the tile candidate computed in this step may be computed by a similar method to that of the first embodiment because it is not something that changes due to the execution of the warping processing.

On the other hand, because changes in distribution occur for the number of light paths storable in the predetermined node buffer due to the warping processing, the number of light paths for which the number of fragments is unclear can be considered to increase. Because a change in the distribution is made in the warping in accordance with the density distribution of the importance, the predicted number of fragments included in equation 1 in this embodiment is computed with:

$$\text{Predicted number of fragments} = \frac{\sum_{i}^{N} n_i w_i}{\sum_{i}^{N} w_i} \quad (3)$$

as a weighted average value using importance. Where, N is the number of pixels of the tile candidate. Also, $n_i$ is the pixel value of the i-th pixel in the tile candidate of the fragment number map, and $w_i$ is the pixel value of the i-th pixel in the tile candidate of the importance map. Note, because the denominator of equation 3 is the sum total of the pixel values of the pixels in the tile candidate of the importance map, it can be computed by multiplying the number of pixels included in the tile candidate which is the lowest layer with the importance of the target pixel in the mipmap of the importance map.

Note, the computation method of the predicted number of fragments in this embodiment is based on the premise that ideal warping processing is performed. Ideal warping processing is such that the size of the two-dimensional region corresponding to the pixels of the map after the warping processing is proportional to the importance value of the pixels in a case where the processing is executed for a tile. For example, a case is considered in which a tile is defined for one pixel of the mipmap of the processing target layer. Here, if the pixels of the importance map referenced in the generation of the pixel are four pixels having pixel values 1, 2, 3 and 4 respectively, in the tile after the warping, the area ratios of the regions corresponding to the pixels will be 1:2:3:4. In other words, in a case where 256 ray-bundle rays are defined for a tile, 26, 51, 77 and 102 ray-bundles will be allocated for the regions corresponding to the pixels respectively. In other words, more ray-bundle rays can be allocated for regions corresponding to high importance pixels.

Also, in this embodiment explanation is given having the ideal warping processing performed, but an approximation method of the ideal warping processing may be employed as disclosed in Rosen. In other words, it should be easily understood that the later described prediction method in the tiling processing of this embodiment can be adopted for a warping method that obtains an approximation solution.

By employing the predicted number of fragments obtained in this way, parameters necessary for the tile generation determination can be computed considering the execution of the warping processing. Note, when the tiling processing completes by the processing from this step onwards being executed, the CPU 101 moves the processing to step S702 after executing the processing of step S207 of the light map generation processing.

In step S702, the GPU 104, under the control of the CPU 101, generates the ray-bundles having executed the warping processing in accordance with the importance distribution for the selected tile, and updates the value of the light map being generated while performing the light transport computation using the VRAM 105 for each ray-bundle.

As explained above, by employing the prediction method of this embodiment, the light map generation can be performed with more optimized memory usage by generating the ray-bundles adaptively using the warping processing.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the prediction method and the method of generation according to the present invention are realizable by a program executing the methods on a computer. The program is providable/distributable by being stored on a computer-readable storage medium or through an electronic communication line.

This application claims the benefit of Japanese Patent Application No. 2013-074433, filed Mar. 29, 2013, which is hereby incorporated by reference herein in its entirety.

What is claimed is:

1. A prediction method that predicts, in an illuminating computation of a 3D scene performed by defining a plurality of ray-bundles for a light transport computation for predetermined ray directions, a number of ray-bundle light paths for the light transport computation storable in a predetermined memory region, the prediction method comprising:

a first generation step of generating a fragment number map having a predetermined number of pixels, and a mipmap of the fragment number map, for which a pixel value of each pixel is made to be a number of fragments in the 3D scene on a straight line of a ray direction corresponding to a position of the pixel;

a derivation step of deriving, in a case where, for a pixel of one layer in the mipmap of the fragment number map generated in the first generation step, ray-bundles for the light transport computation are defined for a corresponding region in the 3D scene corresponding to the pixel, an estimated number of fragments included on average on one light path; and a prediction step of outputting, as a predicted number of light paths of ray-bundles for the light transport computation storable in the predetermined memory region for the pixel of the one layer, a value obtained from a size of the predetermined memory region being divided by the estimated number of fragments derived in the derivation step, wherein, in the derivation step, the estimated number of fragments is derived by a compensation value being added to a number of fragments, which is a pixel value of the pixel of the one layer, the compensation value corresponding to a layer of the pixel.

2. The prediction method according to claim 1, wherein the compensation value is determined based on a number of pixels on the fragment number map corresponding to a pixel value of a pixel of a top layer included in the mipmap of the fragment number map and the pixel of the one layer.

3. The prediction method according to claim 1, wherein the compensation value is set to a larger value the lower the layer of the mipmap of the fragment number map under which the pixel of the one layer falls is.

4. A method of generation for generating a light map by an illuminating computation of a 3D scene performed by defining ray-bundles for a light transport computation for each of a plurality of ray directions, comprising:

a setting step of setting a ray direction that defines ray-bundles for the light transport computation;

a first generation step of generating a fragment number map having a predetermined number of pixels, and a mipmap of the fragment number map, for which a pixel value of each pixel is made to be a number of fragments in the 3D scene on a straight line of a ray direction set in the setting step corresponding to a position of the pixel;

a second generation step of generating an importance map, having the same number of pixels as the fragment number map, for which a pixel value of each pixel is made to be a texel density of an illumination texture applied to a fragment existing on the same straight line as a corresponding pixel of the fragment number map, and a mipmap of the importance map;

a determining step of determining a processing region which is a unit for which, with respect to the 3D scene in the set ray direction referring to the mipmap of the fragment number map and the mipmap of the importance map, ray-bundles for the light transport computation are defined and an illuminating computation for light map generation is executed; and a computation step of defining ray-bundles for the light transport computation and executing illuminating computation for light map generation for each processing region determined in the determining step, wherein in the determining step, for pixels of the same position of one layer in the mipmap of the fragment number map and the mipmap of the importance map, in a case where a predicted number of ray-bundle light paths for the light transport computation storable in a predetermined memory region, output to a corresponding region in the 3D scene corresponding to the pixels by the prediction method according to claim 1, is larger than a number of texels included in the corresponding region, the corresponding region is determined to be the processing region.

5. A non-transitory computer-readable storage medium storing a program for causing a computer to execute each step of the method of generation according to claim 4.

6. A non-transitory computer-readable storage medium storing a program for causing a computer to execute each step of the prediction method according to claim 1.

7. A prediction method that predicts, in an illuminating computation of a 3D scene performed by defining a plurality of ray-bundles for a light transport computation for predetermined ray directions, a number of ray-bundle light paths for the light transport computation storable in a predetermined memory region, comprising:

a first generation step of generating a fragment number map having a predetermined number of pixels, and a mipmap of the fragment number map, for which a pixel value of each pixel is made to be a number of fragments in the 3D scene on a straight line of a ray direction corresponding to a position of the pixel;

a second generation step of generating an importance map, having the same number of pixels as the fragment number map, for which a pixel value of each pixel is made to be a texel density of an illumination texture applied to a fragment existing on the same straight line as a corresponding pixel of the fragment number map, and a mipmap of the importance map;

a derivation step of, for a pixel of one layer in the mipmap of the fragment number map generated in the first generation step, determining a parameter that changes, in accordance with a distribution of a texel density in a region of the importance map referenced in the generation of a pixel of the mipmap of the importance map corresponding to the pixel, a distribution of a ray-bundles for the light transport computation to be defined and deriving, in a case where the distribution of ray-bundles for the light transport computation after changing for a corresponding region of the 3D scene corresponding to the pixel of the one layer is defined, referring to the determined parameter, an estimated number of fragments included on average on one light path; and a prediction step of outputting, as a predicted number of light paths of ray-bundles for the light transport computation storable in the predetermined memory region for the pixel of the one layer, a value obtained from a size of the predetermined memory region being divided by the estimated number of fragments derived in the derivation step, wherein, in the derivation step, the estimated number of fragments is derived by a weighted average being taken, with a texel density which is a corresponding pixel value of the importance map, for a number of fragments, which is a pixel value of the fragment number map for the corresponding region, and a compensation value according to a layer of the pixels being added to an obtained weighted average number of fragments.

* * * * *